(12) United States Patent
Buyukcorak et al.

(10) Patent No.: US 11,930,041 B2
(45) Date of Patent: Mar. 12, 2024

(54) GENERALIZED LOCALIZATION SYSTEM BASED ON PHYSICAL LAYER SUPPORTED SPOOFING DETECTION AND IDENTIFICATION VERIFICATION

(71) Applicants: ISTANBUL TEKNIK UNIVERSITESI, Istanbul (TR); GEBZE TEKNIK UNIVERSITESI, Kocaeli (TR)

(72) Inventors: Saliha Buyukcorak, Kocaeli (TR); Gunes Zeynep Karabulut Kurt, Istanbul (TR)

(73) Assignees: ISTANBUL TEKNIK UNIVERSITESI, Istanbul (TR); GEBZE TEKNIK UNIVERSITESI, Kocaeli (TR)

( * ) Notice: Subject to any disclaimer, the term of this patent is extended or adjusted under 35 U.S.C. 154(b) by 466 days.

(21) Appl. No.: 17/274,791

(22) PCT Filed: Sep. 17, 2019

(86) PCT No.: PCT/TR2019/050769
§ 371 (c)(1),
(2) Date: Mar. 10, 2021

(87) PCT Pub. No.: WO2020/060522
PCT Pub. Date: Mar. 26, 2020

(65) Prior Publication Data
US 2022/0053020 A1 Feb. 17, 2022

(30) Foreign Application Priority Data
Sep. 21, 2018 (TR) .................................. 2018/13715

(51) Int. Cl.
*H04L 9/40* (2022.01)

(52) U.S. Cl.
CPC ...... *H04L 63/1466* (2013.01); *H04L 63/1425* (2013.01)

(58) Field of Classification Search
CPC .................... H04L 63/1466; H04L 63/1425
See application file for complete search history.

(56) References Cited

U.S. PATENT DOCUMENTS

| | | | |
|---|---|---|---|
| 6,990,428 B1 * | 1/2006 | Kaiser | H04B 17/21 709/224 |
| 2005/0154925 A1 * | 7/2005 | Chitrapu | H04L 9/3234 726/19 |

(Continued)

FOREIGN PATENT DOCUMENTS

| | | |
|---|---|---|
| WO | 2010028278 A2 | 3/2010 |
| WO | 2015164803 A1 | 10/2015 |
| WO | 2016147177 A1 | 9/2016 |

OTHER PUBLICATIONS

Fan Y, Zhang Z, Trinkle M, Dimitrovski AD, Song JB, Li H. A cross-layer defense mechanism against GPS spoofing attacks on PMUs in smart grids. IEEE Transactions on Smart Grid. Aug. 28, 2014;6(6):2659-68 (Year: 2014).*

(Continued)

*Primary Examiner* — Catherine Thiaw
(74) *Attorney, Agent, or Firm* — Bayramoglu Law Offices LLC

(57) ABSTRACT

A generalized localization system based on a physical layer aided spoofing signal attacks detection and an identification verification for hybrid heterogeneous networks including aerial and terrestrial communication systems is provided. The generalized localization system includes: a data preprocessing and separation block, a parameter extraction block, a local localization engine, a reliability assessment and trust management block, a location based anomaly detector block and a global fusion center.

1 Claim, 2 Drawing Sheets

(56) References Cited

U.S. PATENT DOCUMENTS

| | | | |
|---|---|---|---|
| 2005/0197136 A1* | 9/2005 | Friday | H04W 64/00 455/456.1 |
| 2010/0127920 A1* | 5/2010 | Harper | G01S 19/215 342/357.58 |
| 2010/0131751 A1 | 5/2010 | Reznik et al. | |
| 2014/0150100 A1* | 5/2014 | Gupta | G06F 21/316 726/22 |
| 2015/0222659 A1* | 8/2015 | Abou-Rizk | G06F 21/57 726/26 |
| 2016/0127931 A1* | 5/2016 | Baxley | G06T 7/60 455/67.16 |
| 2017/0013538 A1 | 1/2017 | Ward et al. | |
| 2017/0228277 A1 | 8/2017 | Cheng et al. | |

OTHER PUBLICATIONS

Xiaokang Ye, et al., Neural-Network-Assisted UE Localization Using Radio-Channel Fingerprints in LTE Networks, IEEE Access, 2017, pp. 12071-12087, vol. 5.

Junghyun Jun, et al., Low-Overhead WiFi Fingerprinting, IEEE Transactions on Mobile Computing, 2018, pp. 590-603, vol. 17, No. 3.

Bingpeng Zhou, et al., The Error Propagation Analysis of the Received Signal Strength-Based Simultaneous Localization and Tracking in Wireless Sensor Networks, IEEE Transactions on Information Theory, 2017, pp. 3983-4007, vol. 63, No. 6.

Younes Ahmadi, et al., Range Free Localization in Wireless Sensor Networks for Homogeneous and Non-Homogeneous Environment, IEEE Sensors Journal, 2016, pp. 8018-8026, vol. 16, No. 22.

* cited by examiner

GENERALIZED LOCALIZATION SYSTEM BASED ON PHYSICAL LAYER SUPPORTED SPOOFING DETECTION AND IDENTIFICATION VERIFICATION

CROSS REFERENCE TO THE RELATED APPLICATIONS

This application is the national stage entry of International Application No. PCT/TR2019/050769, filed on Sep. 17, 2019, which is based upon and claims priority to Turkish Patent Application No. 2018/13715, filed on Sep. 21, 2018, the entire contents of which are incorporated herein by reference.

TECHNICAL FIELD

The invention is related to a generalized localization system based on physical layer supported spoofing signal attacks detection and identification verification for hybrid heterogeneous networks including aerial and terrestrial communication systems.

BACKGROUND

Nowadays location based services are an indispensable part of various user scenarios and applications. Heterogeneous networks based on the principle of using different wireless networks that may also include unmanned aerial platforms having mobile and flexible usage features, reveal significant potential for high precision localization systems.

Accordingly the invention provides a generalized localization framework for hybrid heterogeneous networks comprising aerial and terrestrial communication systems. In the designed localization scheme both the aerial and the terrestrial systems can be formed of different wireless network structures. The devices in each of these networks are able to use different radio access technologies (RATs), are able to operate on different frequency bands and can have different transmission characteristics. For example, while terrestrial systems can comprise cellular networks, wireless local area network (WLAN), wireless sensor network (WSN), aerial systems can use latest access technologies such as millimeter-Wave and free space optical communication (FSO). In this context unmanned aerial platforms can be various high altitude or low altitude aerial vehicles such as drones, helicopters, airplanes, balloons.

Global navigation satellite system (GNSS) is the most commonly used localization technology. [1]

Additionally, in the literature, alternative localization technologies that use current various terrestrial communication structures such as cellular networks, WLAN, WSN are also available. [1-4]

In the United States Patent document numbered US20100131751A1 of the prior art, an apparatus and method for carrying out physical layer security processes has been disclosed. The apparatus subject to the invention comprises a physical layer which has been configured to receive an explosion, continuously carry out measurements and report said measurements, a middle access control (MAC) layer configured to process the measurements received from the physical layer, to determine an abnormal situation depending on said measurements, and to send a security alert upon determining an abnormal situation, and a trust manager configured to apply a counter precaution upon receiving the security alert from the MAC layer.

In the United States Patent document numbered US2017013538A1 of the prior art, an emission control diagram which aims to limit the localization and identification of the wireless device with known friendly wireless networks is disclosed.

In the International patent document numbered WO2015164803A1 of the prior art a wireless device is linked to an access point and is surrounded by additional access points that are not linked (linked access points).

When all of these documents of the prior art are examined, a localization system that is dependent on detection of spoofing signal attacks and identification verification, and also taking precautions against such attacks has not been encountered.

Therefore developing a generalized localization system for hybrid heterogeneous networks comprising aerial and terrestrial communication systems, based on detecting spoofing signal attacks and identification verification as well as taking precautions against such attacks, is required.

SUMMARY

The aim of this invention is to provide a generalized localization system for hybrid heterogeneous networks, which includes aerial and terrestrial communication systems, that detect physical layered spoofing signal attacks and takes precautions against such attacks.

Another aim of the invention is to provide a generalized localization system based on identification verification for hybrid heterogeneous networks comprising aerial and terrestrial communication systems.

BRIEF DESCRIPTION OF THE DRAWINGS

The localization system provided in order to reach the aims of the invention has been illustrated below.

Figure 1:
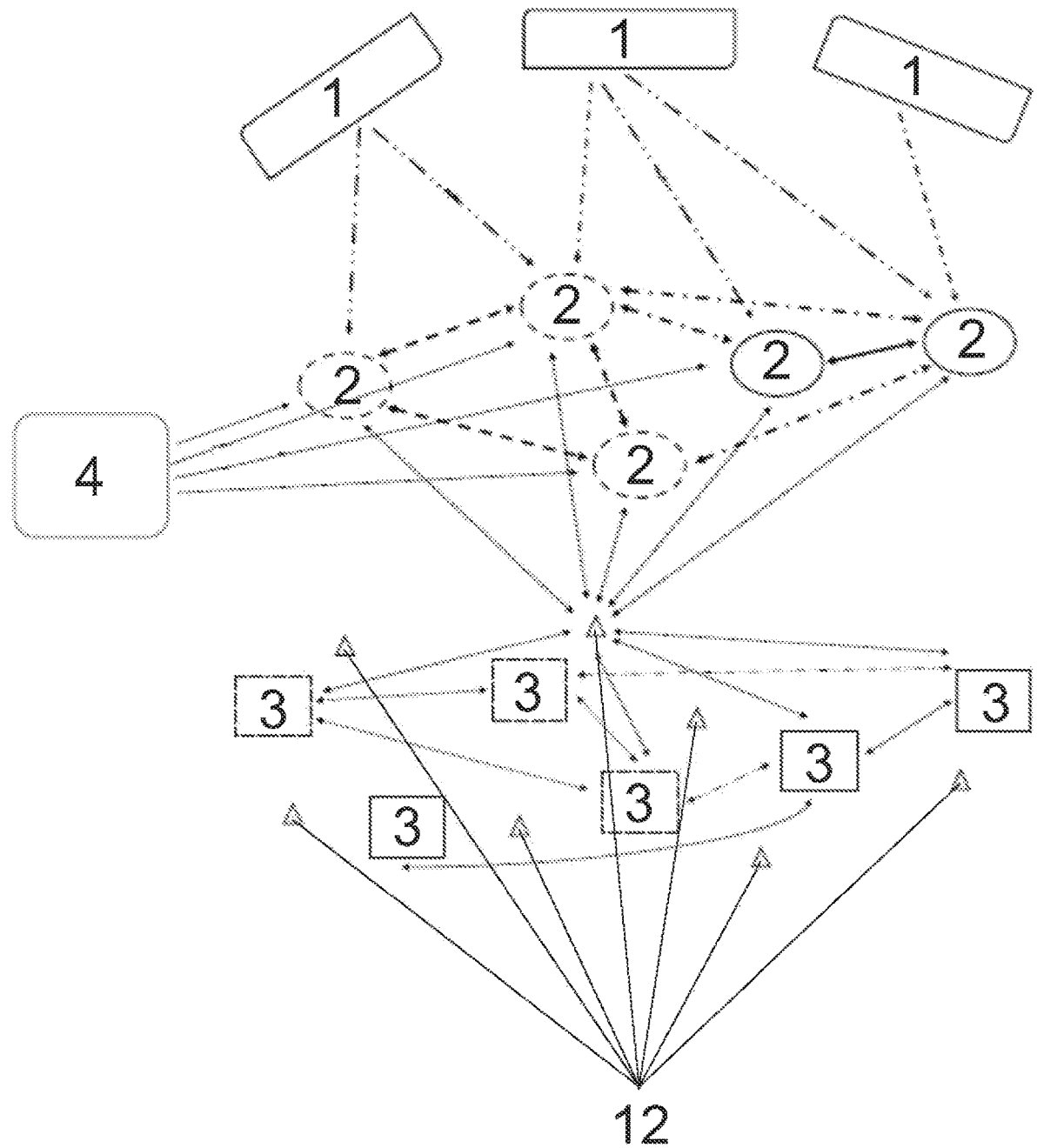
FIG. 1: schematic view of an embodiment of the localization system subject to the invention.

The parts in the figures have each been numbered and the references of each number have been provided below.

1. GNSS satellite
2. Aerial reference node (ARN)
3. Terrestrial reference node (TRN)
4. Spoofing signal attack device
5. Data preprocessing and separation block,
6. Parameter extraction block
7. Local localization unit
8. Reliability assessment and trust management block
9. Location based anomaly detection block
10. Global fusion center
11. Physical layer information (PLI)
12. User

DETAILED DESCRIPTION OF THE EMBODIMENTS

The invention is a localization system comprising;

A data preprocessing & separation block (5) which collects the physical layer information (11) such as the received signal strength (RSS), the time of arrival (ToA), angle of arrival (AoA), and allows the corresponding information to be converted into vector and/or matrix format, A parameter extraction block (6) which estimates environment-related parameters that affect the localization performance (such as path loss exponent (PLE), shadowing and fading, blockage probability, transmission probabilities of line of sight (LoS) or non line of sight (non-LoS, NLOS)) by exploiting physical layer information (11), a local localization engine (7) which receives the outputs of data preprocessing & separation blocks (5) and parameter extraction blocks (6) in terrestrial systems, which has been designed to perform localization via the data of each network in hybrid heterogeneous networks, and which enables to locally determine the unknown locations of the users (12) by means of a machine learning based localization algorithm, reliability assessment and trust management block (8) where the system parameters outputted from the parameter extraction block (6) is transmitted and besides localization, the reliability level of the location estimations of each network is determined- to increase global localization performance, a location based anomaly detector block (9) which determines whether there is a spoofing signal attack between the data preprocessing & separation block (5) and parameter extraction blocks (6), a global fusion center (10) which upon determining the information corresponding the unknown locations of users (12) for each network in the hybrid heterogeneous network comprising both aerial and terrestrial systems and the weights of these networks relative to localization reliability, receives said information.

An embodiment of the suggested system has been provided in FIG. 1. The system aims to localize the users (12) whose locations are unknown by using aerial reference nodes (2) and the terrestrial reference nodes (3) whose locations are known. The locations of terrestrial reference nodes (3) can be determined accurately as a result of infrastructure planning and installation stages and otherwise they can be determined with GNSS technology. Knowing the terrestrial reference nodes (3) in a terrestrial system formed of two layered cellular networks that uses GSM900, GSM1800 access technologies, from the installation planning of base stations can be given as an example to this situation. As aerial reference nodes (2) are mobile, their locations can frequently change and as a result their locations can be determined real time, using GNSS technology.

However such real time location determination processes are quite susceptible to malicious intentioned attacks. In spoofing signal attacks, the spoofing signal attack device (4) may transmit signals that are similar with the GNSS satellite (1) and may lead to obtaining misleading results without blocking the operations of the target system. The possible attackers in the localization environment may cause incorrect locations of the aerial reference nodes (2) to be determined and therefore may lead to reduced localization performance of users (12). In order to prevent such situations the invention has developed a localization system based on physical layer supported spoofing detection and identification verification.

The transmission links between the devices included in the suggested localization environment have been illustrated in FIG. 1. As it can be seen from FIG. 1, each network which respectively constitutes the aerial reference nodes (2) and the terrestrial reference nodes (3) can intercommunicate via air-to-air (A2A) and ground-to-ground (G2G) channels. Targeted users (12) can communicate using both the aerial reference nodes (2) and the terrestrial reference nodes (3). The transmission link between the user (12) and the aerial reference nodes (2) can be modeled with air-to-ground (A2G) channels. The path loss in air-to-ground (A2G) channels, is depended on the height of the aerial platform and the type of environment (e.g. urban, dense urban), so on.

The suggested system takes into account aforementioned parameters into the localization process and enables to obtain high-performance.

Figure 2:
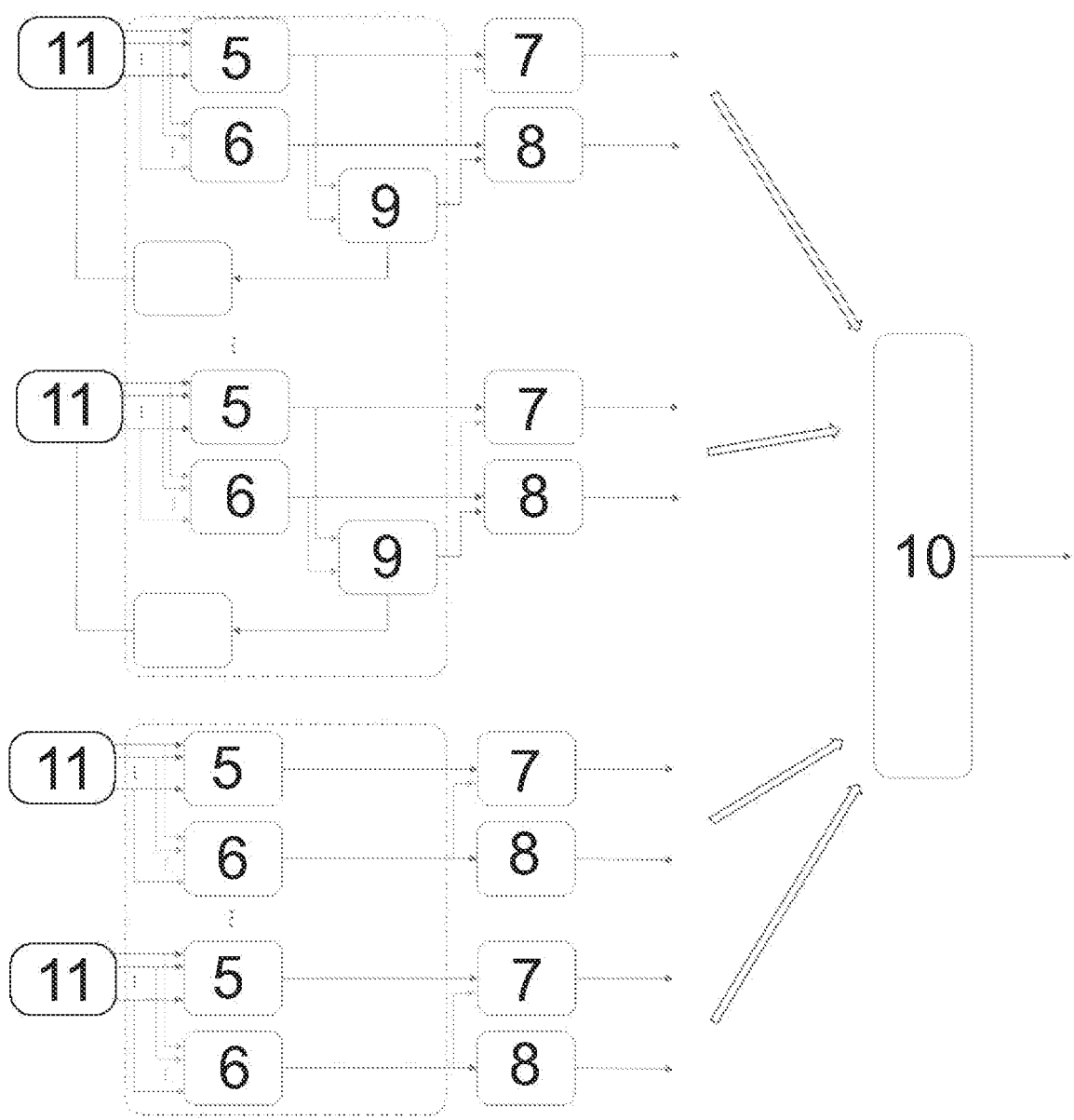
FIG. 2: schematic view of the localization system subject to the invention.

The block designed corresponding the developed localization system has been detailed in FIG. 2. In the invention localization is carried out using one and/or more physical layer information (11) (PLI). The received signal strength, time of arrival, angle of arrival can be given as examples to physical layer information (11).

As it has been illustrated in FIG. 2, the physical layer information (11) collected from aerial and terrestrial systems are primarily processed in data preprocessing & separation blocks (5) and parameter extraction blocks (6). The data preprocessing & separation block (5) enables the collected data to be converted into a suitable format where the localization algorithm can be used.

The localization algorithm mentioned herein, can be one of the machine learning based techniques such as expectation maximization (EM), metropolis-hastings (MH), sequential Monte Carlo (SMC). Said algorithms, jointly use the physical layer information (11) obtained from the aerial reference nodes (2) and the terrestrial reference nodes (3) that are available in the hybrid heterogeneous network. Accordingly, a vector or a matrix can be formed with the related information for mathematical convenience.

The parameter extraction block (6) estimates the parameters related to the environment that affects the localization performance. These parameters may vary for aerial and terrestrial systems and even for each network layer. Due to this reason in order to both gain time, and reduce work load, the parameter extraction block (6) knows the parameters that it needs to estimate for each network type as preliminary information. Moreover the collected physical layer information (11) comprises preliminary information which defines the network type the information belongs to. Path loss exponent, shadowing and fading levels, blockage probability, line of sight and non-line of sight transmission probabilities can be given as examples to these parameters.

After the parameters that need to estimate according to each network type are determined by means of the available preliminary information, the determination of said parameters is carried out using the related method. Here, the path loss exponent and fading parameter values are determined by means of the minimum mean square error (MMSE) method, using physical layer information (11).

This method can be applied numerically by drawing depending on distance, the physical layer information collected from the reference nodes whose locations are known, and by finding a correlation that may express this physical layer information via regression and thereby said parameters will have been obtained.

The probability of blockage is the probability of the transmission links between the user and the reference nodes, to be cut off. This probability is obtained using the parameter values that have been experimentally determined for the localization environment related to said model, via Random shape theory model or Loss ball blockage model. These parameters related to the localization environment of said models can be found in literature. Otherwise, said parameters can be calculated using formulae that have been provided in the related literature for said parameters and by using the building density ratios of the localization region.

In terrestrial systems, the output information of the data preprocessing & separation blocks (5) and the parameter extraction blocks (6) are transmitted to the local localization engine (7). This block has been designed in order to provide localization via the data of each network in the hybrid heterogeneous network, and as a result the unknown locations of the users (12) are determined with a localization algorithm based on machine learning.

The unknown locations of the users can be determined using localization algorithms. In a model-based localization process, first of all, the physical layer information (11) of the relevant environment is collected by using the existing reference nodes, and then the parameters such as the path loss exponent, and shadowing and fading levels are obtained by regression using the related software. As this step, is the data collection phase for model estimation of the environment, it is generally called the calibration phase. This phase is continued by the phase of estimating the unknown location by using the obtained information.

Here, (log-)likelihood and (posterior) joint (log-)likelihood functions are written out respectively using random distributions such as Gaussian and Gamma in relation to the physical network layer information (11) obtained from reference nodes. A localization problem based on a maximum likelihood estimator (MLE) has been designed to find the most probable location parameters that maximize the obtained distribution that has been obtained in said positioning environment for the related physical network layer information (11).

Accordingly, said algorithms, determine the unknown locations of the users by maximizing the (posterior) joint (log-)likelihood function obtained using physical network layer information (11) that is obtained from reference nodes. In localization algorithm the maximization process mentioned is carried out iteratively. When there is significant change between the present and prior values of the (posterior) joint (log-)likelihood function or when a certain iteration value is reached in the system as preliminary information, iteration is ended.

In the invention a machine learning based localization algorithm is taken into consideration where information that is more reliable against measurement uncertainties and that is accessible can be included with flexibility into the localization process of preliminary information. The localization algorithm mentioned herein, can be dependent on one of the commonly used and reliable machine learning based techniques such as expectation maximization (EM), metropolis-hastings (MH) and sequential Monte Carlo (SMC).

Here, a reliability assessment and trust management block (8) has been designed in order to determine besides localization, the reliability assessment of location estimations of each network and to increase global localization performance. In this block a weight is determined for estimating the local location of each network. These weights can be determined according to the changing rate of system parameters that have been obtained from the parameter extraction block (6). While the weight of the network whose system parameters have almost not changed at all is determined to be higher, the weight of the network which changes shall be determined as much lower.

The parameter extraction block (6) in the suggested system collects the new physical layer information (11) and re-calculates the parameters related to said network and transmits the obtained results to the reliability assessment and trust management block (8). The reliability assessment and trust management block (8) compares the old and new parameter values and is operated such that the reliability weight of the network whose rate of change is lower is made higher.

The low rate of change of the respective parameters can be interpreted as the signal propagation environment of said network to be almost stable, and the large reliability exponent determined by the assurance that the local localization performance of this network is high will also increase the global positioning performance calculated using the weighted superposition principle.

A location based anomaly detector block (9) which determines whether there is a spoofing signal attack between the data preprocessing & separation block (5) and parameter extraction blocks (6) is present in aerial systems.

In the location based anomaly detector block (9) first of all the locations of these nodes whose locations are known as preliminary information and which are called reference nodes in the related network are calculated using one of the above mentioned localization algorithms.

The calculated location value and the known location value are compared and if the calculated location value is higher than a certain reliability degree it is decided that an attack is present. The reliability degree relevant the spoofing signal attack is determined by system managers as preliminary information and they can be changed dynamically according to the performance of the suggested localization system.

As it has been mentioned above the unmanned aerial platforms are used as reference nodes of locating users (12) whose locations are unknown and the locations of the aerial reference nodes (2) are determined as real time using GNSS technology.

Location based anomaly detection block (9) re-estimates the locations of aerial platforms who's locations are known via the GNSS technology using a machine learning based localization algorithm and it compares both results and if the value obtained is lower than a certain reliability level, it gives a spoofing signal attack warning. In case of a warning, physical layer information (11) is requested again from the related aerial network.

In aerial systems, similar to the terrestrial systems, the outputs of data preprocessing & separation blocks (5) and parameter extraction blocks (6) are transmitted to the local localization engine (7) and the unknown locations of the users (12) are determined locally by means of a machine learning based localization algorithm.

However in aerial systems, different to terrestrial systems, when the weight of the related network is determined in the reliability assessment and trust management block (8), the results of the location based anomaly detection block (9) is taken into consideration besides the systems parameters obtained in the parameter extraction block (6). In the invention the mobile, unmanned aerial platforms can be sent to the related regions in case of primary needs in unexpected temporary situations such as disasters, traffic jams and/or situations that necessitate high precision localization.

Upon determining the information associated the unknown locations of users (12) for each network in the hybrid heterogeneous network comprising both aerial and terrestrial systems and the weighted average of each network relative to localization reliability said information is transmitted to the global fusion center (10). The final estimation is calculated for the unknown locations of users (12) by said information in the global fusion center (10) designed as a weighted combiner.

The locations of the users (12) are determined by using common and reliable (against measurement uncertainties) machine learning methods such as expectation maximization (EM), metropolis-hastings (MH) and sequential Monte Carlo (SMC) in the local localization engine (7) for each network within the hybrid heterogeneous network. This local location information obtained and weights relating to each network are combined with a weighted superposition principle and as a result the locations of users (12) are determined globally.

The invention provides a design of a high precision localization system based on physical layer supported spoofing signal attacks detection and identification verification for hybrid heterogeneous networks comprising aerial and terrestrial communication systems. In said localization system, the communication between aerial reference nodes (2) and terrestrial reference nodes (3) can be performed as downlink and uplink by the user (12).

In the downlink transmission, the user (12) is the receiver and the reference nodes operate as the transmitter. The user (12) who collects all of the physical layer information (11) received from the reference nodes, can not only determine location by recording this information locally but the user can also submit said information to the fusion center where localization will be performed. Here, the user (12) has a multiple wireless interface that can communicate with all the different network structures in the hybrid heterogeneous network.

In the uplink transmission the user (12) shall act as the transmitter and the reference nodes shall act as the receiver. The localization system suggested in the multi-directional transmission can be operated for two different scenarios.

In the first scenario each of the aerial reference nodes (2) and the terrestrial reference nodes (3) collects the physical layer information (11) for a certain monitoring period and this information can be processed locally in data preprocessing & separation blocks (5) and parameter extraction blocks (6) located in the nodes. In other words said blocks are located in each node. In such a case, the parameter extraction block (6) does not need to store the parameters that are required for estimation for each network type as preliminary information.

Additionally in the location based anomaly detection block (9) designed for aerial systems, each aerial platform estimates only its own position and determines the spoofing signal attack.

According to second scenario each network type in the hybrid heterogeneous network collects the physical layer information (11) transiently and this information is processed in the data preprocessing & separation blocks (5) and parameter extraction blocks (6) designed for each network. In such a case the location based anomaly detection block (9) estimates all of the aerial platform locations in the related network of the aerial and determines if there is an attack or not. Moreover the local localization engine (7) functions as a type of local fusion center.

REFERENCES

[1] X. Ye, X. Yin, X. Cai, A. Perez Yuste and H. Xu, "Neural-Network-Assisted UE Localization Using Radio-Channel Fingerprints in LTE Networks," in IEEE Access, vol. 5, pp. 12071-12087, 2017.
[2] J. Jun et al., "Low-Overhead WiFi Fingerprinting," in IEEE Transactions on Mobile Computing, vol. 17, no. 3, pp. 590-603, Mar. 1, 2018.
[3] B. Zhou, Q. Chen and P. Xiao, "The Error Propagation Analysis of the Received Signal Strength-Based Simultaneous Localization and Tracking in Wireless Sensor Networks," in IEEE Transactions on Information Theory, vol. 63, no. 6, pp. 3983-4007, June 2017.
[4] Y. Ahmadi, N. Neda and R. Ghazizadeh, "Range Free Localization in Wireless Sensor Networks for Homogeneous and Non-Homogeneous Environment," in IEEE Sensors Journal, vol. 16, no. 22, pp. 8018-8026, Nov. 15, 2016.

What is claimed is:
1. A localization system, comprising:
at least one memory and processor configured to provide:
a data preprocessing and separation block, wherein the data preprocessing and separation block transmits physical layer information, wherein the physical layer information comprises a received signal strength and a time of arrival and the data preprocessing and separation block allows the physical layer information to be converted into a vector format and/or a matrix format,
a parameter extraction block, wherein the parameter extraction block enables the physical layer information to be transmitted and environment-related parameters to be estimated, the environment-related parameters affect a localization performance, wherein the localization performance comprises a path loss exponent, shadowing and fading levels, a blockage probability and line of sight and non-line of sight transmission probabilities,
a local localization engine, wherein the local localization engine receives outputs of the data preprocessing and separation block and the parameter extraction block in terrestrial systems, the local localization engine is designed to perform a localization via data of each network in hybrid heterogeneous networks, and the local localization engine enables to locally determine unknown locations of users by a machine learning based localization algorithm,
a reliability assessment and trust management block, wherein the reliability assessment and trust management block allows system parameters obtained by collecting the physical layer information of the parameter extraction block and recalculation of the system parameters related to the each network and updating the physical layer information to be transmitted and a reliability level of location estimations of the each network to be determined by comparing previous parameter values with updated parameter values, and the reliability assessment and trust management block increases a global localization performance, a location based anomaly detector block, wherein the location based anomaly detector block recalculates locations of nodes in order to determine if there is a spoofing signal attack between the data preprocessing and separation block and the parameter extraction block and compares a calculated location value and a known location value with location values received from the local localization engine and the location based anomaly detector block determines an attack is present if the calculated location value is higher than a predetermined reliability level,
a global fusion center, wherein the global fusion center, upon determining information associated with the unknown locations of the users for the each network in the hybrid heterogeneous networks comprising both aerial and the terrestrial systems and weights of the hybrid heterogeneous networks relative to a localization reliability, receives the information associated with the unknown locations of the users.

* * * * *